No. 671,787.  
J. E. ANGER.  
BRAKE APPARATUS.  
(Application filed June 8, 1900.)  
Patented Apr. 9, 1901.

(No Model.)  
2 Sheets—Sheet 1.

No. 671,787. Patented Apr. 9, 1901.
J. E. ANGER.
BRAKE APPARATUS.
(Application filed June 8, 1900.)
(No Model.) 2 Sheets—Sheet 2.
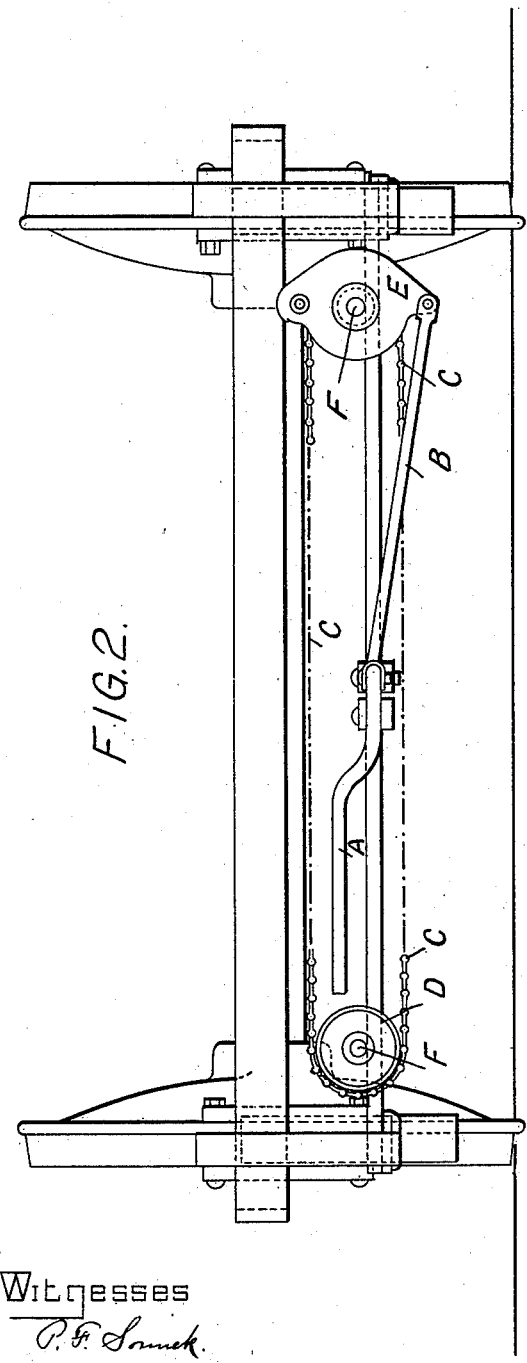
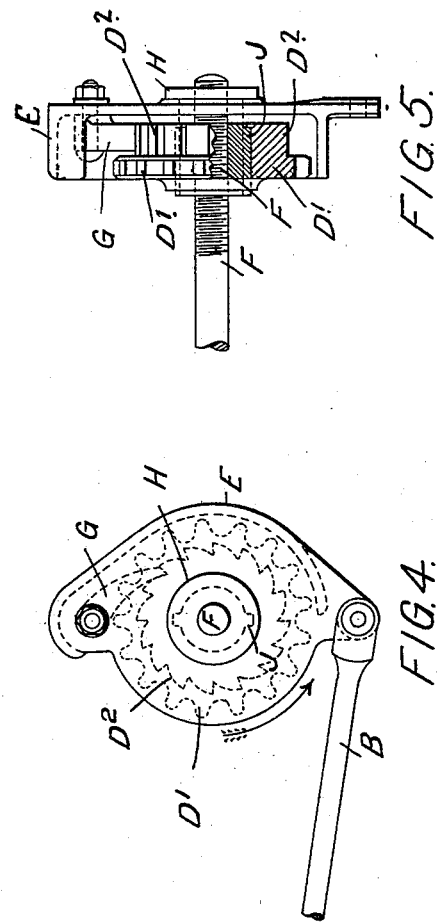
Witnesses
Inventor
John E. Anger

UNITED STATES PATENT OFFICE.

JOHN EDWARD ANGER, OF SOUTHPORT, ENGLAND, ASSIGNOR OF ONE-HALF TO JOHN JACOB NEF, OF PRESTON, ENGLAND.

BRAKE APPARATUS.

SPECIFICATION forming part of Letters Patent No. 671,787, dated April 9, 1901.

Application filed June 8, 1900. Serial No. 19,607. (No model.)

*To all whom it may concern:*

Be it known that I, JOHN EDWARD ANGER, a citizen of the United States of America, residing at Southport, in the county of Lancaster, England, (whose full postal address is 6 Mornington road, Southport, England,) have invented certain new and useful Improvements in Brake Apparatus, of which the following is a specification.

This invention has for its object an apparatus for taking up the slack caused by the wear of the blocks in the ordinary apparatus in general use in England and elsewhere for braking tram-cars and the like. At present the wear is taken up by hand and requires frequent adjustment to insure safety and effective braking results. Now by my invention these rods are screwed up automatically and at frequent intervals exactly as the wear takes place.

Figure 1:
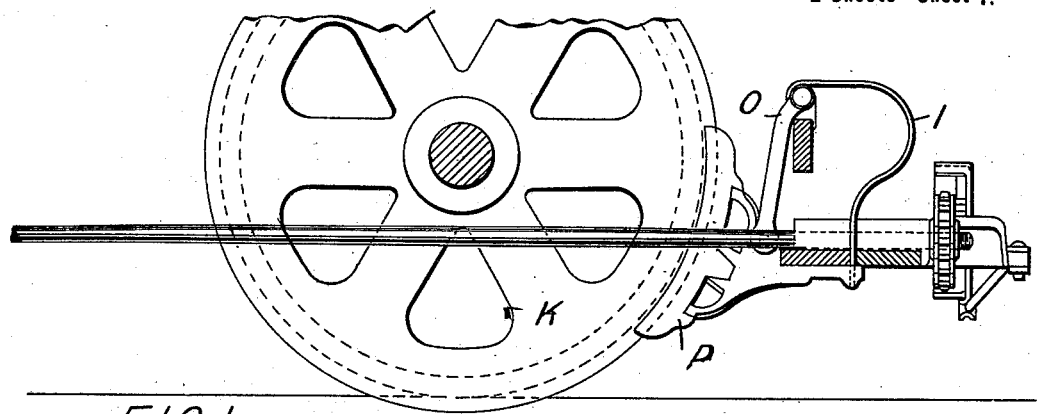
Figure 3:
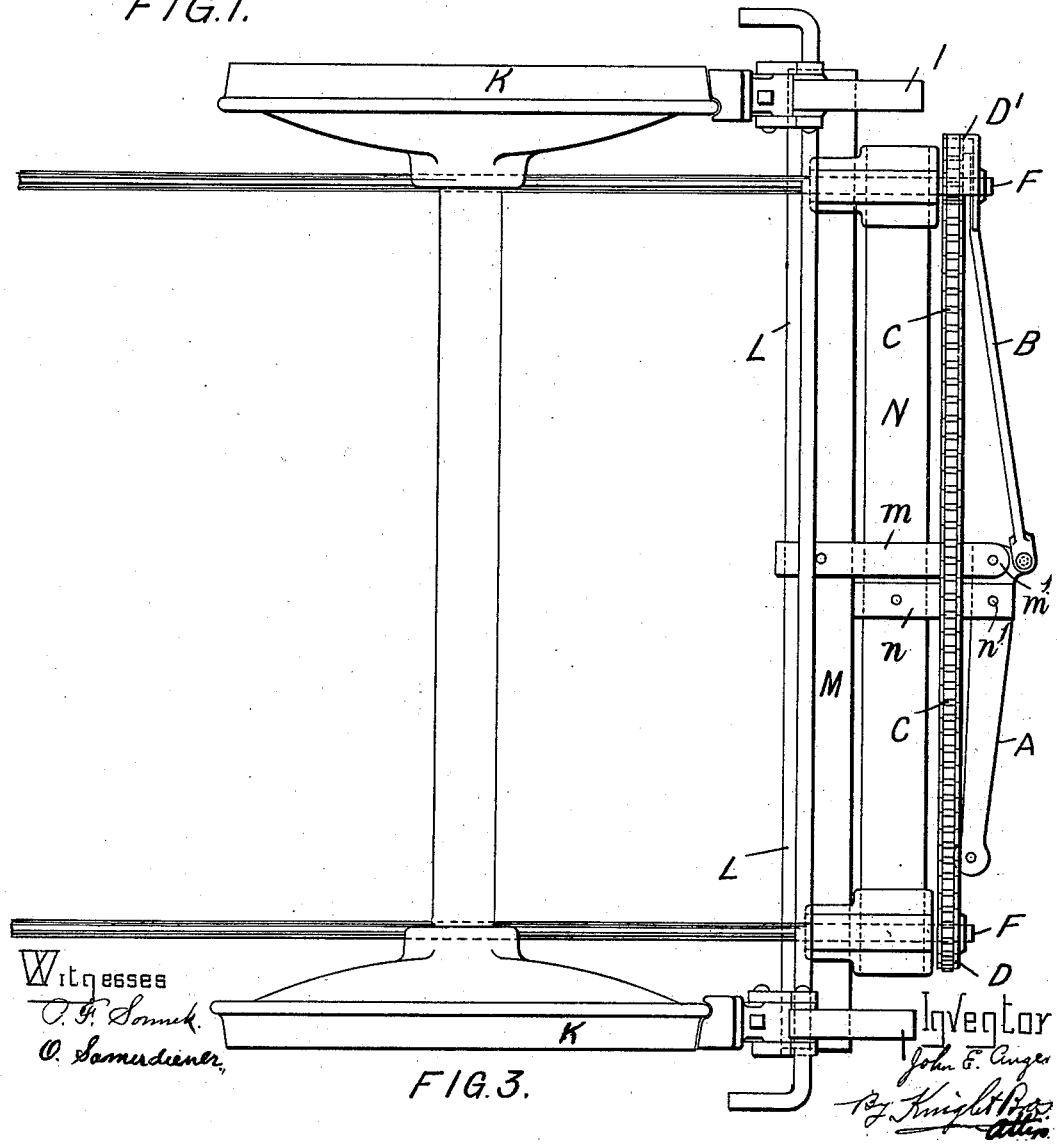

Referring to the drawings, Figure 1 is a view, partly in section, of the wheel, the brake, and the apparatus for adjusting same; Fig. 2, an end view of same; Fig. 3, a plan of same with the body of the car removed; Fig. 4, an end view of sprocket-sheath and adjacent parts; Fig. 5, a transverse view of the same parts, but with the link B removed.

In the drawings, A is the ordinary brake-lever used for putting on the brake; B, a connection from this lever to the sprocket-casing hereinafter described; C, an endless chain connecting the two sprocket-wheels with the two brake-rods F; D, a sprocket-nut into which the screwed end of the brake-rod works and upon which, by means of offsets or feathers J, the sprocket is carried with a free longitudinal motion, working solidly with the nut as regards rotary motion around the axis of the brake-rod.

$D'$ is a sprocket-wheel, and $D^2$ a ratchet-wheel formed in one with the sprocket-wheel; E, a sprocket-casing journaled on the hub of the sprocket-wheel and the nut H.

F represents threaded brake-rods extending from end to end of the car.

At each end is the apparatus shown in Figs. 4 and 5, together with the sprocket-chain C and lever A and the accompanying mountings.

G is a pawl fixed on a spindle having bearings in the sprocket-casing E. This pawl works in the ratchet-wheel $D^2$; H, a nut carrying the ratchet and sprocket; I, release-springs employed for forcing the lever A back to its former position when the temporary application of the brake to the wheel is to be discontinued; J, feathers on nut H, preventing the ratchet and sprocket-wheel from turning.

The remaining parts shown in the drawings are all old and well known; but for convenience of reference I will further enumerate them: K, wheels of car; L, front and rear plates; M and N, the two sliding plates to which the lever A is attached by means of two brackets $m$ and $n$ and pins $m'$ and $n'$; O, Fig. 1, suspension-links carrying the brake-shoe P.

It will be obvious that the brake-rods are screwed right-handed at one end and left-handed at the other.

The mode of action is as follows: When applying the brake, the lever A is drawn outward, which causes the connecting-rod B to move the casing E in the direction of the arrow. Should the lever A from the wear of the shoes travel farther than a given distance, this motion of the casing will cause the pawl G to travel more than the length of one tooth of the ratchet-wheel $D^2$. The pawl will then hold in that tooth, and upon releasing the brake the springs I in forcing the lever back to its former position will cause the connection B to draw the casing E into its original position, and thus the pawl G will move forward the ratchet-wheel $D^2$ one tooth and the sprocket-nut H will tighten up the rod F to the extent of the angular motion of one tooth. Thus whenever the slack increases so as to enable the lever A to move the casing a greater angular distance than one tooth of the ratchet-wheel the slack is automatically taken up, and there being a similar arrangement at each end of the car whichever lever be used that lever will take up the slack, while the sprocket-chain C connecting the two sprockets the slack will be taken up equally on both rods. By this means the brake is kept in proper adjustment as the sprocket-nuts can never loosen and are always moved in the one direction.

I declare that what I claim is—

1. The combination of two threaded brake-rods, a nut on each of same, one of said nuts carrying a ratchet-wheel, a ratchet device actuating said ratchet-wheel, a link connecting the lever with the ratchet device and two sprocket-wheels each fixed to one of the nuts and a sprocket-chain riding on said sprocket-wheels, whereby whenever one sprocket-wheel is turned, the other is turned likewise, and thus both brake-rods are screwed up simultaneously.

2. The combination of two threaded brake-rods, nuts thereon, longitudinal feathers on said nuts, combined ratchet and sprocket wheel on one of said nuts, a sprocket-wheel on the other, a sprocket-chain on said wheels, a sprocket-casing and pawl-carrier, a pawl pivoted on said casing and engaging in said sprocket-wheel, a short-armed brake-lever and a link pivoted to the brake-lever and the sprocket-casing respectively.

3. The combination of two threaded brake-rods, a nut on each of same, a ratchet device actuating one of said nuts, a brake-lever driving said ratchet device and a connecting device connecting the two nuts in such manner that they must turn synchronously and equally.

4. The combination of two threaded brake-rods, a nut on each of same, a ratchet device actuating one of the nuts, the ordinary horizontal brake-lever, means for connecting the said brake-lever with the ratchet device and means for connecting and synchronizing the motion of the two nuts.

In witness whereof I have hereunto signed my name this 20th day of March, 1900, in the presence of two subscribing witnesses.

JOHN EDWARD ANGER.

Witnesses:
G. C. DYMOND,
JOHN McLACHLON.